United States Patent
Vijayvergia et al.

(10) Patent No.: US 12,182,788 B1
(45) Date of Patent: *Dec. 31, 2024

(54) CASH DEPOSIT AT POINT OF SALE USING DEPOSIT PRODUCT INVENTORY ITEM SYSTEMS AND METHODS

(71) Applicant: United Services Automobile Association (USAA), San Antonio, TX (US)

(72) Inventors: Gunjan Vijayvergia, San Antonio, TX (US); Bharat Prasad, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/355,257

(22) Filed: Jul. 19, 2023

Related U.S. Application Data

(63) Continuation of application No. 17/232,141, filed on Apr. 15, 2021, now Pat. No. 11,748,731, which is a continuation of application No. 16/223,594, filed on Dec. 18, 2018, now Pat. No. 11,010,745, which is a continuation of application No. 14/987,046, filed on Jan. 4, 2016, now Pat. No. 10,163,091, which is a
(Continued)

(51) Int. Cl.
*G06Q 20/20* (2012.01)
*G06Q 20/10* (2012.01)
*G06Q 20/28* (2012.01)
*G07F 19/00* (2006.01)

(52) U.S. Cl.
CPC ......... *G06Q 20/208* (2013.01); *G06Q 20/10* (2013.01); *G06Q 20/20* (2013.01); *G06Q 20/203* (2013.01); *G06Q 20/28* (2013.01); *G07F 19/202* (2013.01)

(58) Field of Classification Search
CPC ...... G06Q 20/208; G06Q 20/10; G06Q 20/20; G06Q 20/203; G06Q 20/28; G06F 19/202; G07F 19/202
See application file for complete search history.

(56) References Cited

U.S. PATENT DOCUMENTS

| | | |
|---|---|---|
| 7,076,458 B2 | 7/2006 | Lawlor et al. |
| 7,090,122 B1 | 8/2006 | Warren et al. |
| 7,191,935 B1 | 3/2007 | Brausch et al. |

(Continued)

FOREIGN PATENT DOCUMENTS

WO 9314476 A1 7/1993

*Primary Examiner* — Paul Danneman
(74) *Attorney, Agent, or Firm* — Perkins Coie LLP

(57) ABSTRACT

A system for receiving cash deposits at a point of sale includes a processor; a product inventory database; a communication interface; a product inventory item reader; and a purchase instrument reader. The processor is configured to receive a product code from the product inventory item reader; access the product inventory database to recognize the product code as a deposit product code; receive signals indicating an amount of a deposit associated with the deposit product code; receive signals from the purchase instrument reader identifying an account for the deposit; and send signals to a transaction processing network via the communication interface to thereby effect the deposit of the amount into the account.

20 Claims, 7 Drawing Sheets

Related U.S. Application Data continuation of application No. 13/538,792, filed on Jun. 29, 2012, now Pat. No. 9,230,251.

(60) Provisional application No. 61/504,094, filed on Jul. 1, 2011.

(56) References Cited

U.S. PATENT DOCUMENTS

| | | |
|---|---|---|
| 7,555,461 B1 | 6/2009 | Drummond et al. |
| 7,613,643 B1 | 11/2009 | Putman |
| 7,693,790 B2 | 4/2010 | Lawlor et al. |
| 7,891,550 B1 | 2/2011 | Smith et al. |
| 7,983,401 B1 | 7/2011 | Krinksky |
| 8,146,805 B1 | 4/2012 | Davis et al. |
| 9,230,251 B1 | 1/2016 | Vijayvergia et al. |
| 10,163,091 B1 | 12/2018 | Vijayvergia et al. |
| 11,010,745 B1 | 5/2021 | Vijayvergia et al. |
| 11,748,731 B1 * | 9/2023 | Vijayvergia .......... G07F 19/202 705/22 |
| 2003/0230630 A1 | 12/2003 | Whipple et al. |
| 2005/0121513 A1 | 6/2005 | Drummond et al. |
| 2009/0254479 A1 | 10/2009 | Pharris |
| 2010/0187299 A1 | 7/2010 | Block et al. |
| 2010/0332335 A1 | 12/2010 | Hansen et al. |
| 2011/0208659 A1 | 8/2011 | Easterly et al. |
| 2014/0201068 A1 | 7/2014 | Grunski et al. |

* cited by examiner

CASH DEPOSIT AT POINT OF SALE USING DEPOSIT PRODUCT INVENTORY ITEM SYSTEMS AND METHODS

CROSS REFERENCE TO RELATED APPLICATIONS

This application is a continuation of U.S. patent application Ser. No. 17/232,141, filed Apr. 15, 2021, entitled "CASH DEPOSIT AT POINT OF SALE USING DEPOSIT PRODUCT INVENTORY ITEM SYSTEMS AND METHODS", which is a continuation of U.S. patent application Ser. No. 16/223,594, filed Dec. 18, 2018, entitled "CASH DEPOSIT AT POINT OF SALE USING DEPOSIT PRODUCT INVENTORY ITEM SYSTEMS AND METHODS", issued as U.S. Pat. No. 11,010,745 on May 18, 2021, which is a continuation of U.S. patent application Ser. No. 14/987,046, filed Jan. 4, 2016, entitled "CASH DEPOSIT AT POINT OF SALE USING DEPOSIT PRODUCT INVENTORY ITEM SYSTEMS AND METHODS", issued as U.S. Pat. No. 10,163,091 on Dec. 25, 2018, which is a continuation of U.S. patent application Ser. No. 13/538,792, filed on Jun. 29, 2012, entitled "CASH DEPOSIT AT POINT OF SALE USING DEPOSIT PRODUCT INVENTORY ITEM SYSTEMS AND METHODS", issued as U.S. Pat. No. 9,230,251 on Jan. 5, 2016, which claims priority to U.S. Provisional Patent Application No. 61/504,094, entitled "CASH DEPOSIT AT POINT OF SALE USING DEPOSIT PRODUCT INVENTORY ITEM SYSTEMS AND METHODS", which was filed on Jul. 1, 2011, the contents of each of which are incorporated herein by reference in their entireties for all purposes.

TECHNICAL FIELD

Various embodiments of the present invention relate generally to automated banking transactions. More specifically, various embodiments of the present application relate to depositing money at a point of sale configured for product purchases.

BACKGROUND

While online banking has increased in popularity, many banking transactions still cannot be completed exclusively through exchange of data over a network because these transactions involve exchange of tangible items. These transactions may involve cash deposits, cash withdrawals, check deposits, account cards, printed documents, documents requiring physical signatures, or other tangible items. In these cases, a customer must complete the transaction at a location which facilitates the exchange of these tangible objects.

It is costly for banks to establish staffed bank branches at locations which are convenient for all of their customers. Technology has enabled automatic teller machines (ATMs) to perform some banking functions in a wider variety of locations which are more convenient for customers. ATMs, however, are typically located in public or semi-public locations. Some customers have security and personal safety concerns with respect to performing banking transactions in these locations because the transactions often involve confidential or risky activities such as handling of cash, use of account cards, entry of personal identification numbers (PINs), entry of other transaction data, and/or opening of wallets and purses.

SUMMARY

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

In some embodiments, a system for receiving cash deposits at a point of sale includes a processor; a product inventory database; a communication interface; a product inventory item reader; and a purchase instrument reader. The processor is configured to receive a product code from the product inventory item reader; access the product inventory database to recognize the product code as a deposit product code; receive signals indicating an amount of a deposit associated with the deposit product code; receive signals from the purchase instrument reader identifying an account for the deposit; and send signals to a transaction processing network via the communication interface to thereby effect the deposit of the amount into the account.

In some embodiments the processor is further configured to receive a product code from the product inventory item reader, which product code is comprised by a presentation instrument. The system for receiving cash deposits at a point of sale of claim may include a product deposit code monetary unit sheet having readable product codes for a plurality of monetary units corresponding to currency and coin denominations. The processor, in receiving signals indicating an amount of a deposit associated with the deposit product code, may be configured to determine the amount from a sequence of product codes corresponding to the monetary units corresponding to currency and coin denominations. The processor, in accessing the product inventory database to recognize the product code as a deposit product code may be further configured to recognize the product code as a deposit product code having a variable amount. The processor, in receiving signals indicating an amount of a deposit associated with the deposit product code, may be configured to receive the amount as a keyed entry. The account may be one of a checking account or a savings account.

In some embodiments, a method of receiving cash deposits at a point of sale includes providing a processor; providing a product inventory database; providing a communication interface; providing a product inventory item reader; providing a purchase instrument reader; and configuring the processor to: receive a product code from the product inventory item reader; access the product inventory database to recognize the product code as a deposit product code; receive signals indicating an amount of a deposit associated with the deposit product code; receive signals from the purchase instrument reader identifying an account for the deposit; and send signals to a transaction processing network via the communication interface to thereby effect the deposit of the amount into the account.

The method may include configuring the processor to receive a product code from the product inventory item reader, which product code is comprised by a presentation instrument. The method may further include providing a product deposit code monetary unit sheet having readable product codes for a plurality of monetary units corresponding to currency and coin denominations. The processor, in receiving signals indicating an amount of a deposit associated with the deposit product code, may be configured to determine the amount from a sequence of product codes corresponding to the monetary units corresponding to currency and coin denominations. The processor, in accessing the product inventory database to recognize the product code as a deposit product code, may be configured to recognize the product code as a deposit product code having a variable amount. The processor, in receiving signals indicating an amount of a deposit associated with the deposit product code, may be further configured to receive the amount as a keyed entry. The account comprises one of a checking account or a savings account.

In still further embodiments, a non-transitory computer readable medium having computer executable instructions that, when executed by a processor, configure the processor to: receive product code from a product inventory item reader; access a product inventory database to recognize the product code as a deposit product code; receive signals indicating an amount of a deposit associated with the deposit product code; receive signals from a purchase instrument reader identifying an account for the deposit; and send signals to a transaction processing network to thereby effect the deposit of the amount into the account.

BRIEF DESCRIPTION OF THE DRAWINGS

Embodiments of the present invention will be described and explained through the use of the accompanying drawings.

Figure 1:
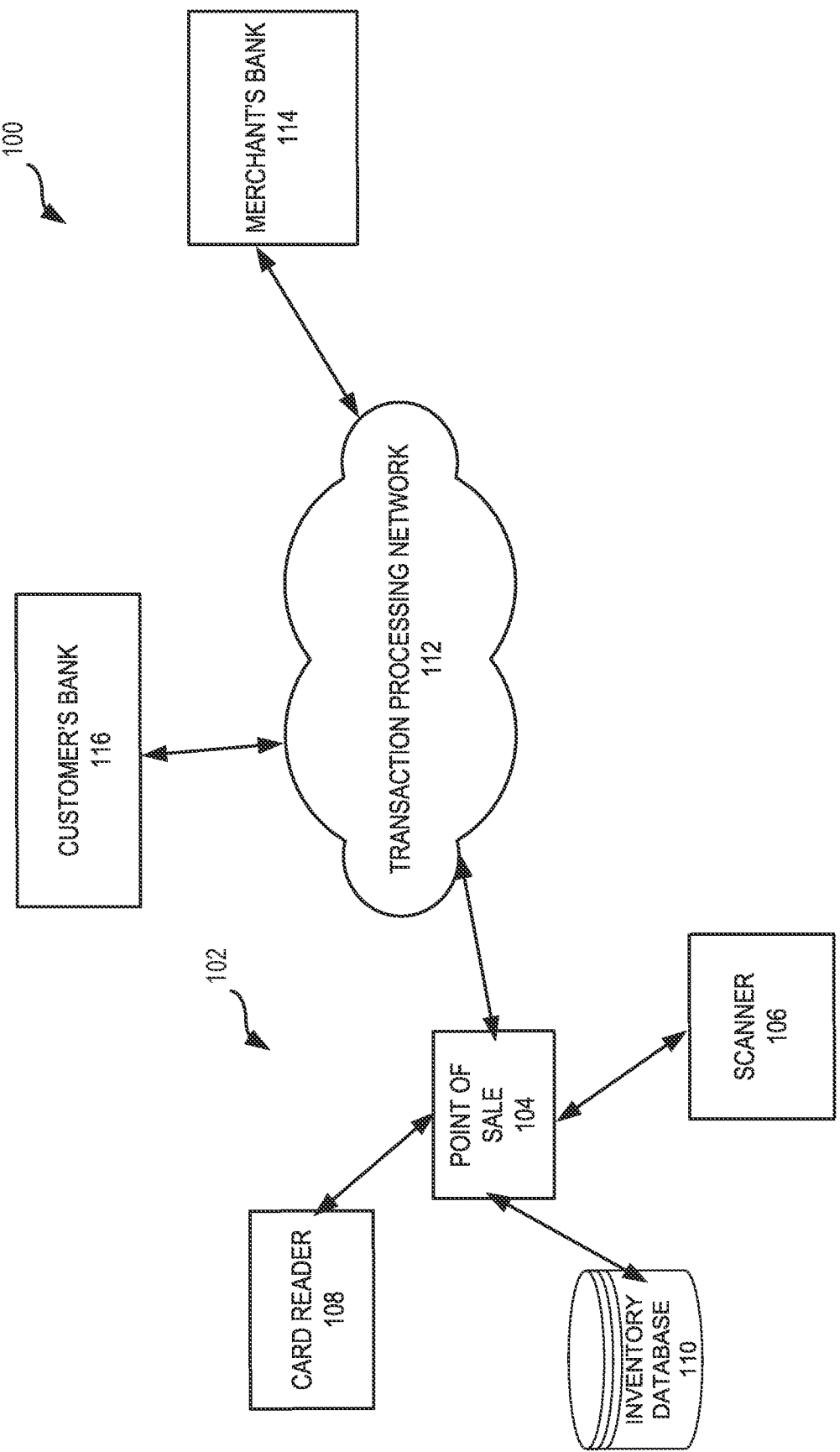
FIG. 1 depicts an exemplary operating environment in which some embodiments of the present invention may be utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments or implementations described. On the contrary, the invention is intended to cover all modifications, equivalents, and alternatives falling within the scope of the invention as defined by the appended claims.

DETAILED DESCRIPTION

Various embodiments of the present invention relate generally to automated banking transactions. More specifically, various embodiments of the present invention relate to receiving banking deposits at a point of sale customarily configured for purchasing products.

The inability to complete deposits at ATMs drives a need for banks having few branches to increase convenience for their customers for transactions such as deposits and receiving payments. According to embodiments of the present invention, a bank can receive a cash deposit from a customer from a point of sale (POS) at, for example, a grocery store or other merchant location. Alternatively, the bank can receive a cash deposit from a customer at a kiosk. The POS may be typically configured for purchasing products. But by configuring cash deposits as an inventory item having a stock keeping unit (Sku) and a universal product code (UPC), a customer can "purchase" a deposit and have the deposit amount rung up as a sale. Additionally, in some embodiments, payments may be received at a point of sale customarily configured for purchasing products, or at a kiosk.

The "price" for the deposit could be a variable amount of currency or coins, or the price could be scanned for individual units of currency and/or coins from a product code scanning sheet. The amount may be keyed into the POS, a kiosk, or the customer's mobile device. Using various applications, a bar code used in purchasing the deposit may be prepared at any time prior to the amount that is actually deposited. For example, the customer may use a mobile application to generate a bar code specifying the deposit details and later present the bar code to a kiosk or POS to complete the purchase. The customer could swipe a presentation instrument, such as a debit card, to have indicate the account to which the purchased deposit should be posted.

In the following description, for the purposes of explanation, numerous specific details are set forth in order to provide a thorough understanding of embodiments of the present invention. It will be apparent, however, to one skilled in the art that embodiments of the present invention may be practiced without some of these specific details. Although many of the embodiments are described with reference to making cash deposits, the illustrated applications of the embodiments of the present invention are not meant to be limiting, but instead exemplary. The invention may apply to many other types of financial transactions performed in a variety of ways and is intended to cover all modifications, equivalents, and alternatives falling within the scope of the invention as defined by the appended claims.

Having described embodiments of the invention generally, attention is now directed to FIG. 1 which illustrates an example of an operating environment 100 in which some embodiments of the present invention may be utilized. The embodiments of the present invention illustrated in FIG. 1 allow cash deposits to be made at a POS, which may be typically configured for purchasing products. Operating environment 100 comprises a merchant location 102 having a point of sale 104, a product scanner 106, a card reader 108, and an inventory database 110. The operating environment also includes a transaction processing network 112, a merchant's bank 114, and a customer's bank 116.

The inventory database includes product inventory items, including deposit products, which may be stored as a single product or as individual products corresponding to, for example, monetary currency units. When a customer wishes to "purchase" a deposit, the clerk or customer provides such indication to the point of sale 104, which may be computer or a POS device. This may be done by scanning a UPC from a product code sheet or a deposit card of the customer or by any of a number of other methods apparent in view of this disclosure. The POS then queries the database 110 for a deposit product associated with the scanned code.

The amount of the deposit may be previously determined, such that a number of such deposits are "rung up" on a single ticket to total the sale. Or the deposit amount may be variable, in which case the POS may receive the amount as a keyed entry.

To complete the sale, the customer may "swipe" a card that provides an indication of which account the customer wants the amount deposited to. In some cases, the customer may be given the opportunity to select from among several accounts, such as checking and savings accounts. The customer also may be required to enter a PIN.

In some cases, the POS may send an "authorization" request through the transaction processing network 112 to "soft post" the transaction or to receive information such as whether the account is live. This may be accomplished like a typical credit card transaction, except that the transaction is later recognized as a deposit, rather than a product sale.

The transaction initially travels to the bank, such as merchant's bank 114, which is associated with the merchant location 102. The merchant's bank 114 acts as the acquiring bank in a typical credit card transaction. A number of such deposit purchases may be accumulated by the merchant's bank 114 and "sold" to the various customer's banks 116 associated with the individual purchased deposits.

Figure 2:
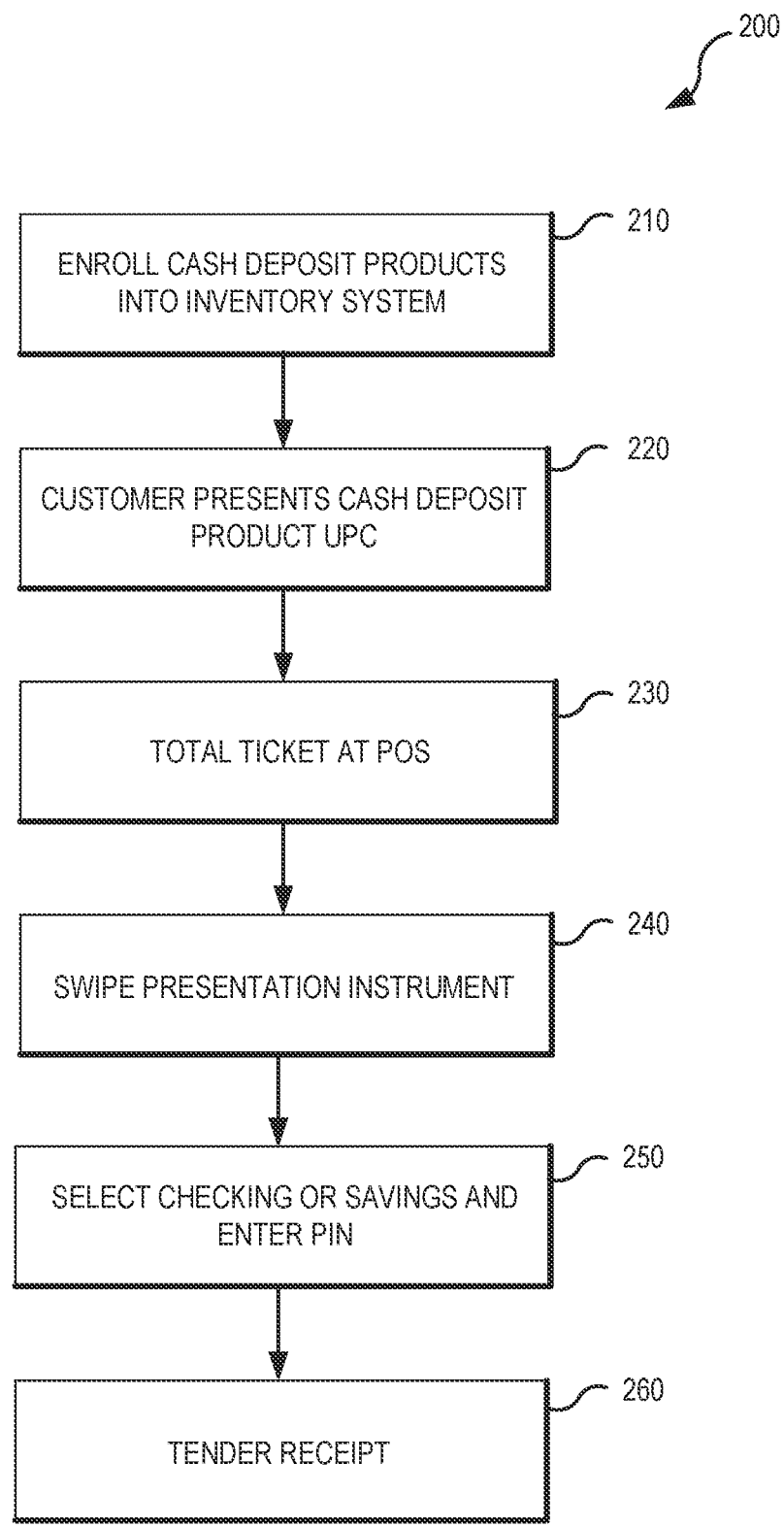
FIG. 2 depicts an exemplary method of depositing cash at a point of sale.

Having described an operating environment 100 in accordance with embodiments of the present invention, attention is directed to FIG. 2, which depicts an exemplary cash deposit method in accordance with embodiments of the present invention. The method 200 may be implemented in the operating environment 10 of FIG. 1. At block 210, cash deposits are enrolled into an inventory system associated with a merchant looking to provide cash deposit products for purchase. The deposit product item may be a single item having a variable "price" or may be a plurality of items, such that several may be totaled to arrive at a total deposit.

Figure 3:
FIG. 3 depicts a UPC scan sheet for cash product deposits in accordance with embodiments of the present invention.

Briefly directing attention to FIG. 3, a cash deposit product code sheet 300 is depicted. This sheet may be located conveniently at a POS so that a clerk could scan one or more to codes on the sheet to arrive at a deposit total.

Figure 4:
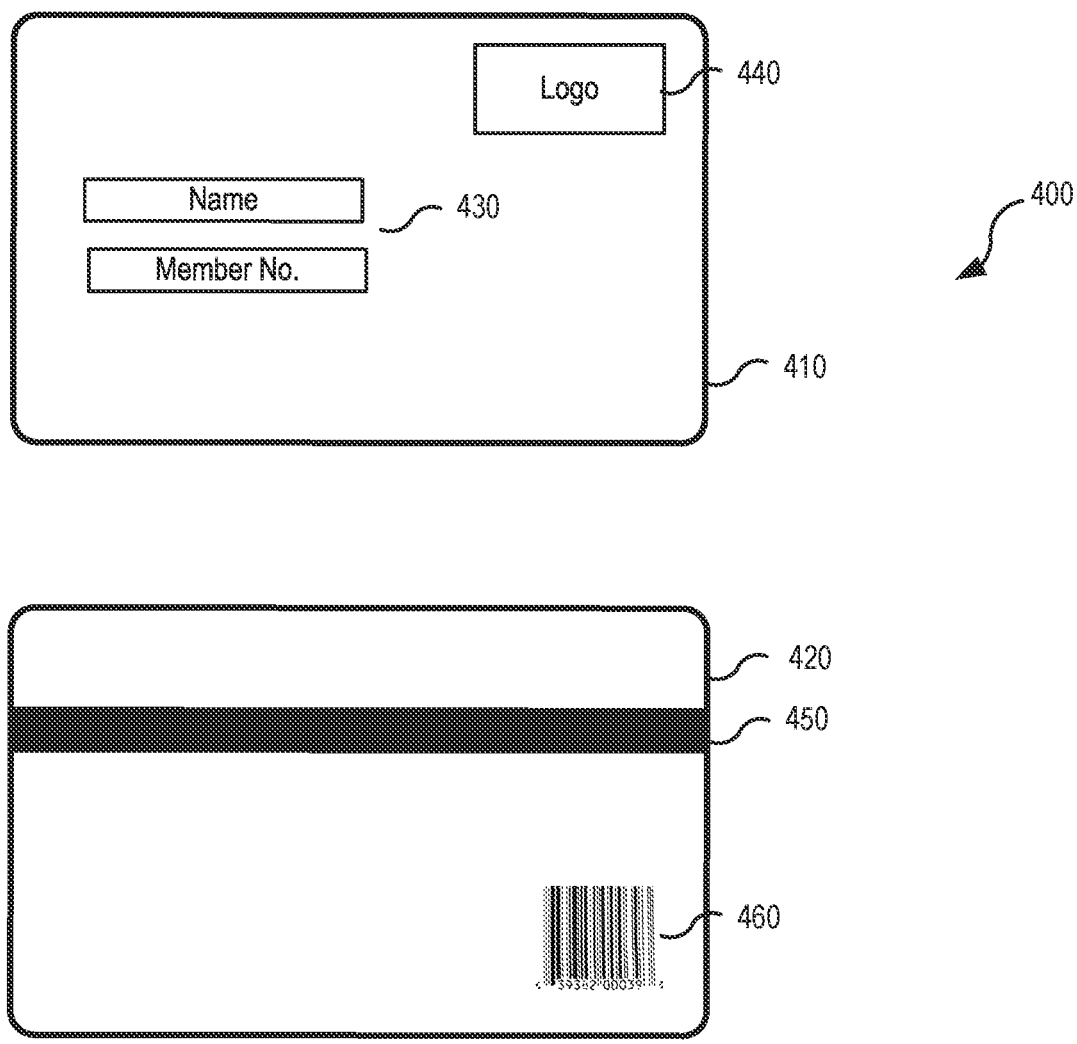
FIG. 4 depicts a membership card having a cash deposit product UPC in accordance with embodiments of the present invention.

Continuing at block 220, a customer presents a cash deposit to a point of sale, which may include simply telling a clerk that he wants to deposit cash. The clerk or customer may scan a particular code to indicate a cash deposit sale. In some embodiments, the scanned code may reside on a card or purchase instrument of the customer. For example, FIG. 4 depicts a membership card 400 having a front 410 and back 420. One side has a place 430 for the customer's name and member number and may have a logo 440. Another side may have a magnetic encoding region 450 and a UPC 460. The UPC, upon scanning, may indicate a cash deposit product purchase. In alternative embodiments, the customer may possess a fob or other readable device that can indicate a cash deposit to a merchant's system. Such devices may include an app on a mobile device that renders a readable code on a display.

At block 230, a sales ticket is totaled for the deposit product. The sales ticket may be a single entry having a specific amount corresponding to the amount to be deposited. Or the sales ticket may have a plurality of items, such as items scanned from the product code sheet 300, indicating the total deposit amount.

At block 240, the customer presents a presentation instrument, which may include swiping a debit card through a reader. This may cause a banking network to be queried to return an authorization or a plurality of accounts into which the customer may be able to make deposits. Hence, at block 250, the customer may be given an opportunity to select between, for example, a savings or a checking account deposit. The customer also may be required to enter a personal identification number to complete the transaction.

Thereafter, a receipt is generated and presented to the customer at block 260 and the customer tenders the cash for the deposit. Additionally, the transaction is processed through a transaction processing network such that the merchant's bank, which initially receives the deposit, tenders it to the customer's bank, all of which may occur in the normal process of settling banking transactions among a number of entities.

Figure 5:
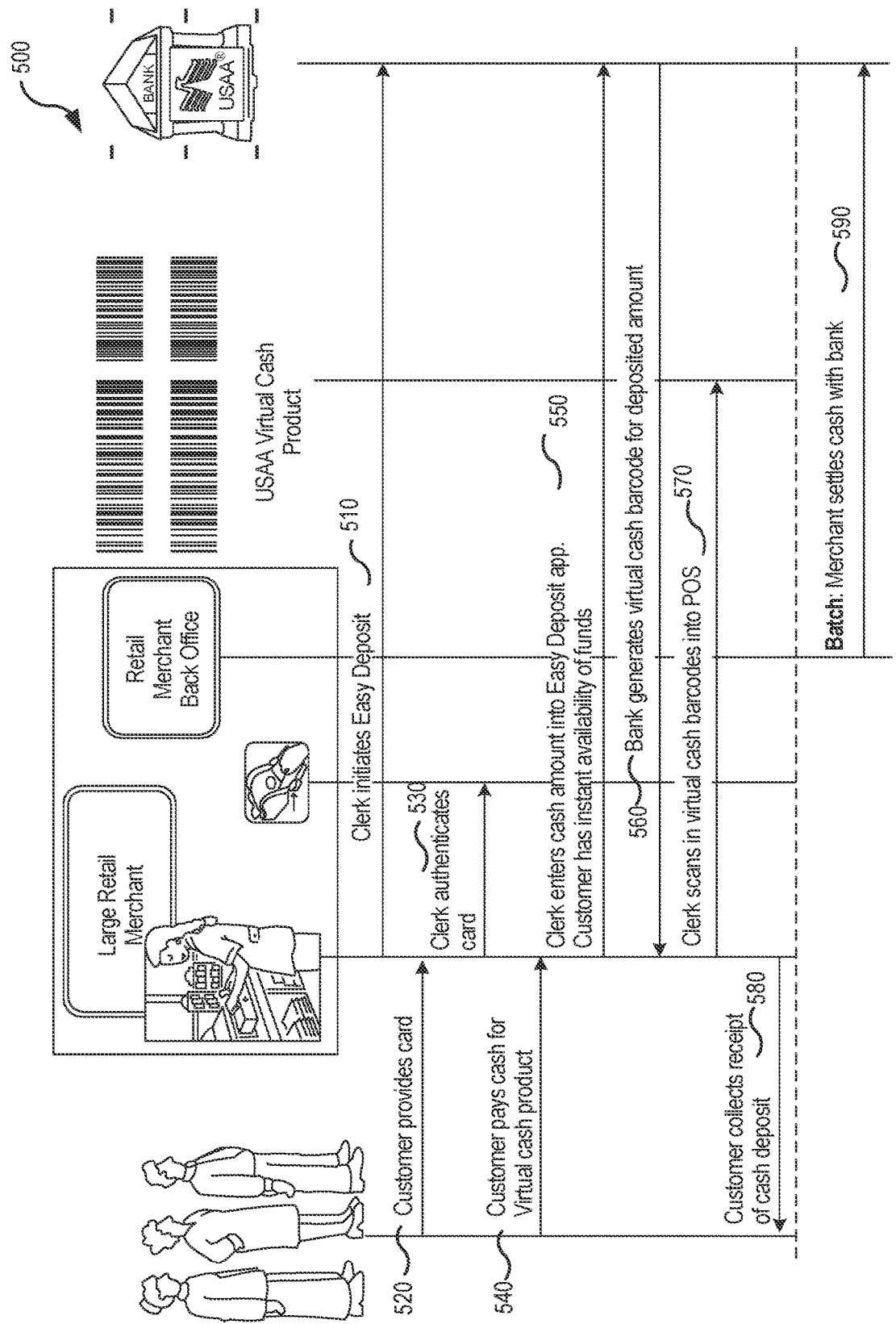
FIG. 5 depicts an exemplary method of depositing cash at a point of sale.

FIG. 5 depicts an exemplary cash deposit method in accordance with embodiments of the present invention. The method 500 may be implemented in the operating environment 10 of FIG. 1. At step 510, a clerk or other operator initiates the deposit at a POS using an application installed on the POS. The application is configured to allow a customer to purchase a cash product. In step 520, a customer provides a card, such as the membership card depicted in FIG. 4. In step 530, the clerk or operator authenticates the card. In step 540, the customer pays for the virtual cash product. The cash product can be in any amount, and the customer can pay using any method of payment. In step 550, the clerk or operator enters the cash amount into the application at the POS, providing the member with instantly available funds. Information regarding the transaction is sent to a recipient, such as a bank, by way of the application. In step 560, the bank generates virtual cash barcodes for the deposited amount. In step 570, the clerk or operator scans in the virtual cash barcode into the POS. In step 580, the customer may collect a receipt of cash deposit. In step 590, the merchant may settle one or more transactions in a batch mode.

Figure 6:
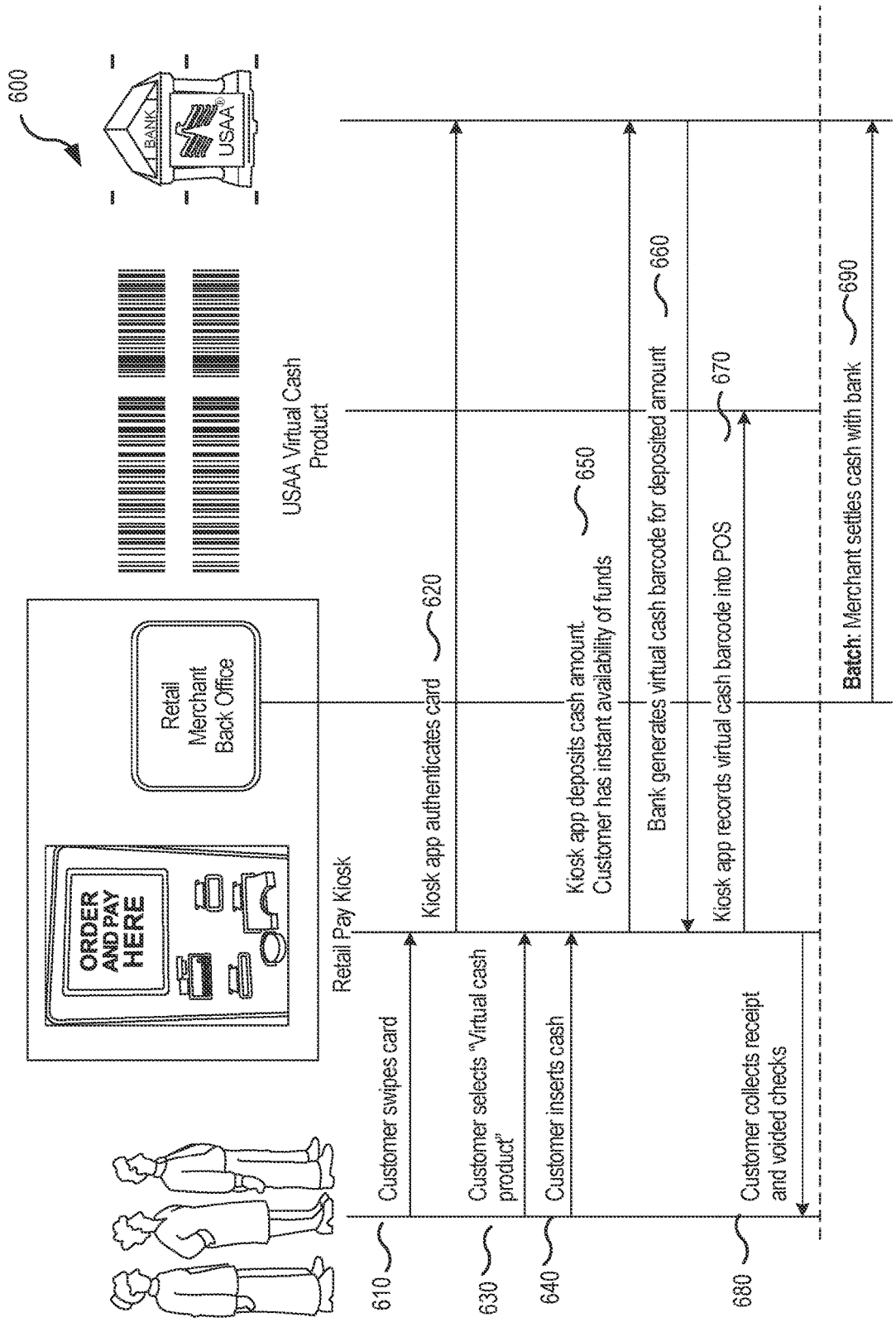
FIG. 6 depicts and exemplary method of depositing cash at a kiosk.

FIG. 6 depicts an exemplary cash deposit method in accordance with embodiments of the present invention. In step 610, a customer presents a card such as the membership card depicted in FIG. 4 to a kiosk. The kiosk application authenticates the card in step 620. The customer indicates a selection of a virtual cash product at the kiosk in step 630 and provides the cash amount to the kiosk in step 640. In step 650, the kiosk application deposits the cash amount by sending the information to a recipient such as a bank. This allows the customer instant availability to the funds. In step 660, the bank generates virtual cash barcode for deposited amount. In step 670, the kiosk application records the virtual cash barcode into a POS. In step 680, the customer may receive a receipt and collect voided checks, if applicable. In step 690, a merchant may settle one or more transactions with the bank in a batch mode.

Conveniently, in some embodiments, the customer may use an application installed on a personal computing device such as a mobile device to generate a barcode prior to arriving at a POS or kiosk. For example, the customer may provide identification such as providing a membership number or by accessing the application on a known device. The customer provides an amount to the application and the application may provide the customer with a barcode. The barcode may be made available to the customer in various ways. For example, the barcode may be emailed to the customer. The customer may then present the barcode to the clerk at the POS or to a kiosk, at which point the virtual cash barcodes are scanned in and the purchase of a cash deposit is made. Thus, in some embodiments, the barcode may be generated by a customer at any time prior to presentment at a POS or kiosk. When a barcode is generated on a mobile device or other personal computing device, the data contained within the barcode may be encrypted. The encryption allows for embedding data such as transaction IDs, personal data, timestamps for verification and expiration, and to prevent misuse of the barcode data. The expiration timestamp may be the time after which the deposit is no longer valid. In some embodiments, the barcode is a datamatrix such as a quick response (QR) code.

In some embodiments, the deposit can be made to reload a pre-paid card at the point of sale. The ability to reload prepaid cards may eliminate or reduce the need for banking accounts for depositing cash.

In a final, specific exemplary embodiment, a membership organization having an associated bank with few, if any, deposit locations, provides its member/bank customers with a membership card or presentation instrument having deposit instructions or provides access to a mobile device app which can be used at merchant locations to make deposits. The membership organization populates corresponding inventory items to cooperating merchants' inventory systems. A member having cash to deposit "purchases" the deposit from a merchant location and tenders the cash, also selecting an account into which to make the deposit. The member receives a receipt and the deposit transaction is settled through a processing network as with other transactions.

The embodiments discussed above may be equally extendable to payments. Thus, instead of making a deposit, the customer is making a payment via cash. The payment may be made to another person or to a business.

Figure 7:
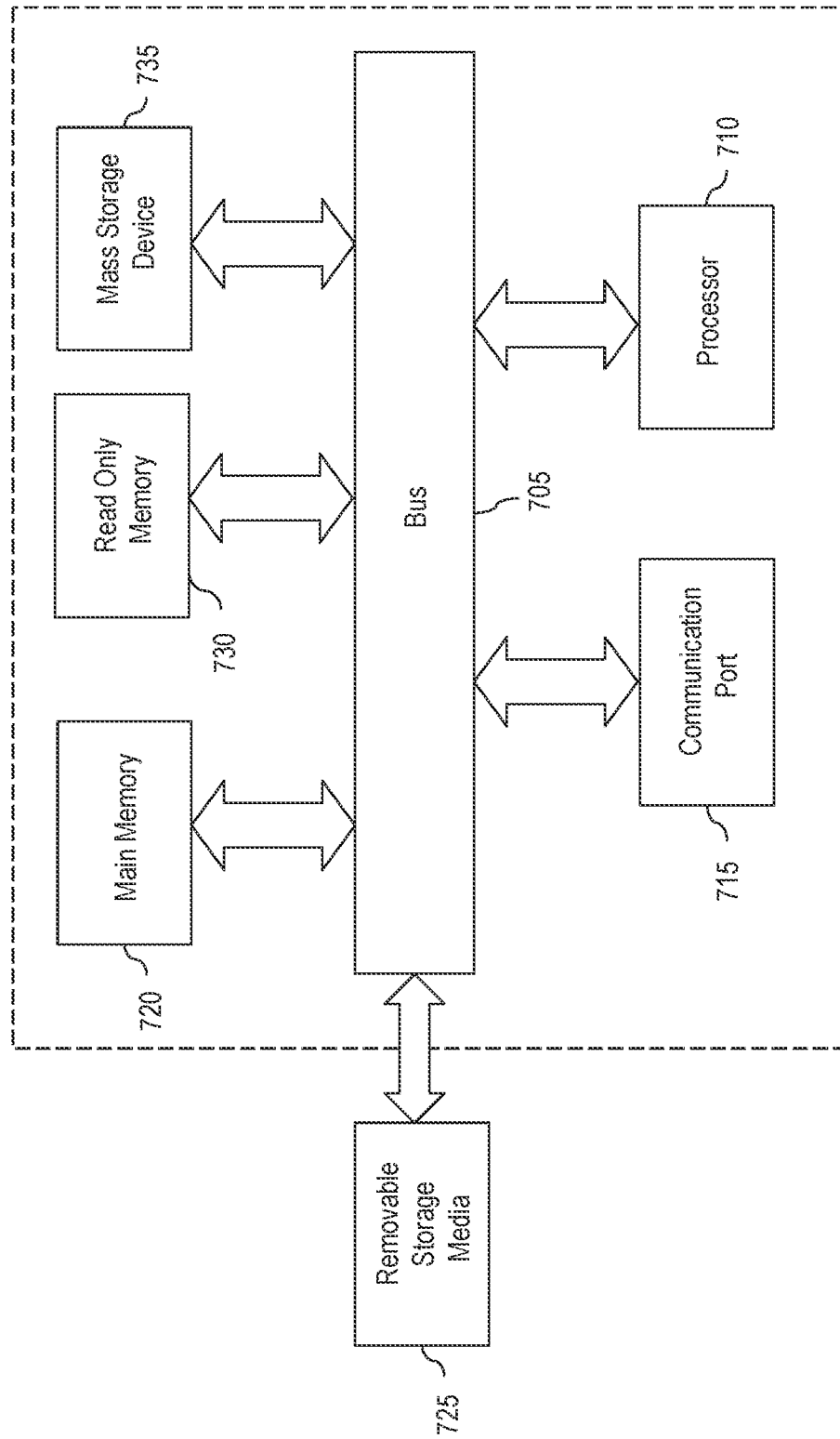
FIG. 7 illustrates an example of a computer system with which some embodiments of the present invention may be utilized.

Exemplary Computer System Overview:

Embodiments of the present invention include various steps and operations, which have been described above. A variety of these steps and operations may be performed by hardware components or may be embodied in instructions which are machine-executable and machine-readable. These instructions may be used to cause a general-purpose or special-purpose processor programmed with the instructions to perform the steps. Alternatively, the steps may be performed by a combination of hardware, software, and/or firmware. As such, FIG. 7 is an example of a computer system 700 with which embodiments of the present invention may be utilized. According to the present example, the computer system includes a bus 705, at least one processor 710, at least one communication port 715, a main memory 720, a removable storage media 725, a read only memory 730, and a mass storage 735.

Processor(s) 710 can be any known processor, such as, but not limited to, an Intel® Itanium® or Itanium 2® processor(s), or AMD® Opteron® or Athlon MP® processor(s), or Motorola® lines of processors. Communication port(s) 715 can be any of an RS-232 port for use with a modem based dialup connection, a 10/100 Ethernet port, or a Gigabit port using copper or fiber. Communication port(s) 715 may be chosen depending on a network such a Local Area Network (LAN), Wide Area Network (WAN), or any network to which the computer system 700 connects.

Main memory 720 can be Random Access Memory (RAM), or any other dynamic storage device(s) commonly known in the art. Read only memory 730 can be any static storage device(s) such as Programmable Read Only Memory (PROM) chips for storing static information such as instructions for processor 710.

Mass storage 735 can be used to store information and instructions. For example, hard disks such as the Adaptec® family of SCSI drives, an optical disc, an array of disks such as RAID, such as the Adaptec family of RAID drives, or any other mass storage devices may be used.

Bus 705 communicatively couples processor(s) 710 with the other memory, storage, and communication blocks. Bus 705 can be a PCI/PCI-X or SCSI based system bus depending on the storage devices used.

Removable storage media 725 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

The components described above are meant to exemplify some types of possibilities. In no way should the aforementioned examples limit the scope of the invention, as they are only exemplary embodiments.

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "in some examples" and the like generally mean the particular feature, structure, or characteristic following the phrase is included in at least one embodiment of the present invention, and may be included in more than one embodiment of the present invention. In addition, such phrases do not necessarily refer to the same embodiments or different embodiments.

If the specification states a component or feature "may", "can", "could", or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Embodiments of the present invention may be provided as a computer program product which may include a non-transitory machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, embodiments of the present invention are described with reference to performing certain banking transactions, the invention is not limited to the specific examples of transaction described here. The invention may also be applicable to many other types of transactions performed at an automated banking terminal or transactions performed at a computing device of another type.

Also, for the sake of illustration, various embodiments of the present invention have herein been described in the context of computer programs, physical components, and logical interactions within modern computer networks. Importantly, while these embodiments describe various aspects of the invention in relation to modern computer networks and programs, the method and apparatus described herein are equally applicable to other systems, devices, and networks as one skilled in the art will appreciate. As such, the illustrated applications of the embodiments of the present invention are not meant to be limiting, but instead exemplary. Other systems, devices, and networks to which embodiments of the present invention are applicable include, but are not limited to, other types of communication and computer devices and systems. More specifically, embodiments are applicable to communication systems, services, and devices such as computers, smartphones, and mobile computing devices. In addition, embodiments are applicable to all levels of computing from a personal computer to large network mainframes and servers.

In conclusion, the present invention provides novel systems, methods, and arrangements for making cash deposits at a point of sale. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the appended claims.

What is claimed is:

1. A method for depositing funds into a designated account, the method comprising:
   generating, via a mobile application on a mobile device, a deposit code for a deposit;
   displaying, by the mobile device, the deposit code to a point-of-sale device of a merchant,
      wherein the point-of-sale device queries a banking entity based on the deposit code to provide accounts that the point-of-sale device of the merchant is authorized to make deposits in;
   in response to the point-of-sale device querying the banking entity, receiving, by the mobile device, two or more accounts of the banking entity available for the deposit;
   selecting, by the mobile device, a first account of the two or more accounts available for the deposit,
      wherein the point-of-sale device sends one or more signals to a transaction processing network to trigger the deposit in the first account; and
   receiving, at the mobile device, a receipt for the deposit in the first account.

2. The method of claim 1, further comprising:
   encrypting a transaction identification number, personally identifying data of a user associated with the mobile device, and a timestamp for expiration for the deposit; and
   embedding in the deposit code the encrypted transaction identification number, the encrypted personally identifying data of the user, and the encrypted timestamp for expiration for the deposit.

3. The method of claim 1, wherein the deposit code is based on a previous enrollment of one or more deposit products into a product inventory database that assigns one or more deposit codes to one or more deposit products.

4. The method of claim 1, wherein the deposit code specifies an amount to be deposited in association with the deposit code.

5. The method of claim 1, wherein the first account is a bill pay account associated with a user of the mobile device.

6. The method of claim 1, wherein the deposit code includes a transaction identification number, personally identifying data, and a timestamp for expiration.

7. The method of claim 1, wherein a user associated with the mobile device specifies an amount of the deposit in an enrollment for the deposit code.

8. A system comprising:
   one or more processors; and
   one or more memories storing instructions that, when executed by the one or more processors, cause the system to perform a process for depositing funds into a designated account, the process comprising:
      generating, via a mobile application on a mobile device, a deposit code for a deposit;
      displaying, by the mobile device, the deposit code to a point-of-sale device of a merchant,
         wherein the point-of-sale device queries a banking entity based on the deposit code to provide accounts that the point-of-sale device of the merchant is authorized to make deposits in;
      in response to the point-of-sale device querying the banking entity, receiving, by the mobile device, two or more accounts of the banking entity available for the deposit;
      selecting, by the mobile device, a first account of the two or more accounts available for the deposit,
         wherein the point-of-sale device sends one or more signals to a transaction processing network to trigger the deposit in the first account; and receiving, at the mobile device, a receipt for the deposit in the first account.

9. The system according to claim 8, wherein the process further comprises:
   encrypting a transaction identification number, personally identifying data of a user associated with the mobile device, and a timestamp for expiration for the deposit; and
   embedding in the deposit code the encrypted transaction identification number, the encrypted personally identifying data of the user, and the encrypted timestamp for expiration for the deposit.

10. The system according to claim 8, wherein the deposit code is based on a previous enrollment of one or more deposit products into a product inventory database that assigns one or more deposit codes to one or more deposit products.

11. The system according to claim 8, wherein the deposit code specifies an amount to be deposited in association with the deposit code.

12. The system according to claim 8, wherein the first account is a bill pay account associated with a user of the mobile device.

13. The system according to claim 8, wherein the deposit code includes a transaction identification number, personally identifying data, and a timestamp for expiration.

14. The system according to claim 8, wherein a user associated with the mobile device specifies an amount of the deposit in an enrollment for the deposit code.

15. A non-transitory computer-readable medium storing instructions that, when executed by a computing system, cause the computing system to perform operations for depositing funds into a designated account, the operations comprising:
   generating, via a mobile application on a mobile device, a deposit code for a deposit;
   displaying, by the mobile device, the deposit code to a point-of-sale device of a merchant,
      wherein the point-of-sale device queries a banking entity based on the deposit code to provide accounts that the point-of-sale device of the merchant is authorized to make deposits in;
   in response to the point-of-sale device querying the banking entity, receiving, by the mobile device, two or more accounts of the banking entity available for the deposit;
   selecting, by the mobile device, a first account of the two or more accounts available for the deposit,
      wherein the point-of-sale device sends one or more signals to a transaction processing network to trigger the deposit in the first account; and
   receiving, at the mobile device, a receipt for the deposit in the first account.

16. The non-transitory computer-readable medium of claim 15, wherein the operations further comprise:
   encrypting a transaction identification number, personally identifying data of a user associated with the mobile device, and a timestamp for expiration for the deposit; and
   embedding in the deposit code the encrypted transaction identification number, the encrypted personally identifying data of the user, and the encrypted timestamp for expiration for the deposit.

17. The non-transitory computer-readable medium of claim 15, wherein the deposit code is based on a previous enrollment of one or more deposit products into a product inventory database that assigns one or more deposit codes to one or more deposit products.

18. The non-transitory computer-readable medium of claim 15, wherein the deposit code specifies an amount to be deposited in association with the deposit code.

19. The non-transitory computer-readable medium of claim 15, wherein the first account is a bill pay account associated with a user of the mobile device.

20. The non-transitory computer-readable medium of claim 15,
   wherein the deposit code includes a transaction identification number, personally identifying data, and a timestamp for expiration, and
   wherein a user associated with the mobile device specifies an amount of the deposit in an enrollment for the deposit code.

* * * * *